United States Patent [19]

Scheithauer

[11] 4,161,762

[45] Jul. 17, 1979

[54] GAS TUBE ARRESTER PROTECTOR AND METHOD OF ASSEMBLING THE PROTECTOR

[75] Inventor: Eric A. Scheithauer, Chicago, Ill.

[73] Assignee: Cook Electric Company, Morton Grove, Ill.

[21] Appl. No.: 835,411

[22] Filed: Sep. 21, 1977

Related U.S. Application Data

[63] Continuation-in-part of Ser. No. 637,713, Dec. 4, 1975, Pat. No. 4,051,546.

[51] Int. Cl.[2] .............................................. H02H 3/22

[52] U.S. Cl. ...................................... 361/124; 337/32; 337/34; 361/119

[58] Field of Search ............... 361/124, 117, 118, 119, 361/120, 417, 419, 420; 337/28, 31, 32, 33, 34, 29; 174/50, 50.51, 52 R, 52 PE, 52 S; 29/25.1, 25.13, 25.15, 628

[56] References Cited

U.S. PATENT DOCUMENTS

| | | | |
|---|---|---|---|
| 3,251,015 | 5/1966 | Denham | 174/52 PE X |
| 3,798,505 | 3/1974 | Reckard et al. | 361/118 |
| 3,958,154 | 5/1976 | Hill et al. | 361/124 |
| 3,987,343 | 10/1976 | Cunningham | 361/118 |
| 4,009,421 | 2/1977 | Splitt | 361/124 |
| 4,051,546 | 9/1977 | Scheithauer | 361/124 |

FOREIGN PATENT DOCUMENTS 2257888 5/1974 Fed. Rep. of Germany ...... 174/52 PE

OTHER PUBLICATIONS

"Back Sealing Electronic Modules" by Amaro et al., IBM Technical Disclosure Bulletin, pp. 751, 752, vol. 18, Aug. 1975.

*Primary Examiner*—Patrick R. Salce
*Attorney, Agent, or Firm*—Mason, Kolehmainen, Rathburn & Wyss

[57] ABSTRACT

A gas tube arrester protector used in protecting a pair of telephone lines from high voltages or surge currents includes a three electrode gas tube overvoltage arrester having a ground electrode adapted to be coupled to ground potential through a ground lead, a pair of line electrodes, each of which is adapted to be coupled to one of the pair of telephone lines through a terminal line or lead, a flat, generally U-shaped line contact and a fusible link coupled between the line contact and the line electrode. The gas tube arrester is positioned in an insulating housing or shell by disposing the line contact in slots formed by ribs on opposed walls of the housing and by positioning in grooves formed peripherally about an open end of the housing overlapped spacers having overlapping slots to receive the ground and terminal leads. The open end of the housing can be further sealed with an insulating material.

19 Claims, 9 Drawing Figures

Fig. 7
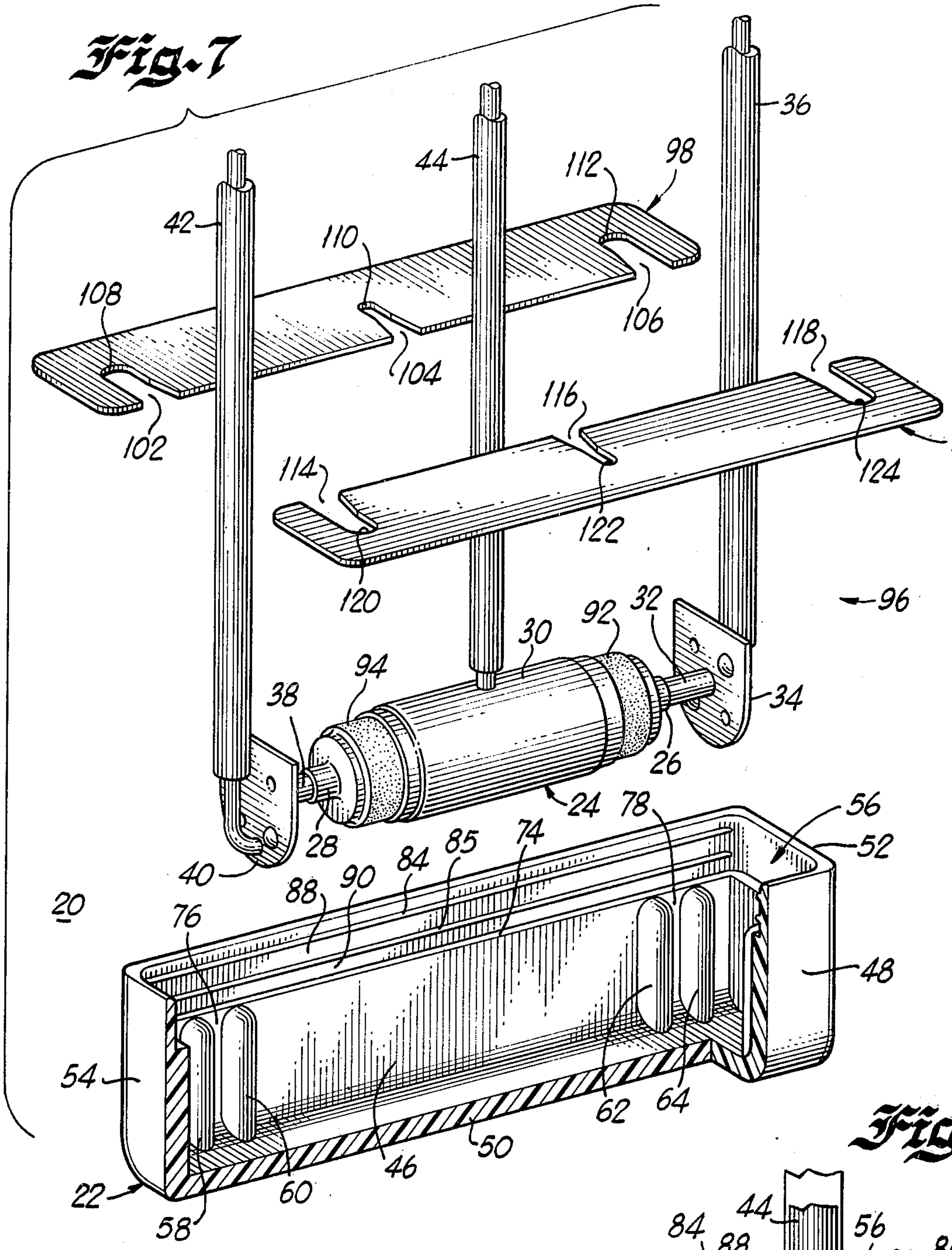
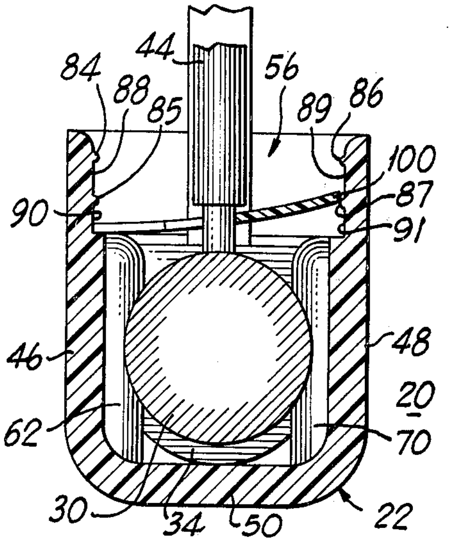
Fig. 9
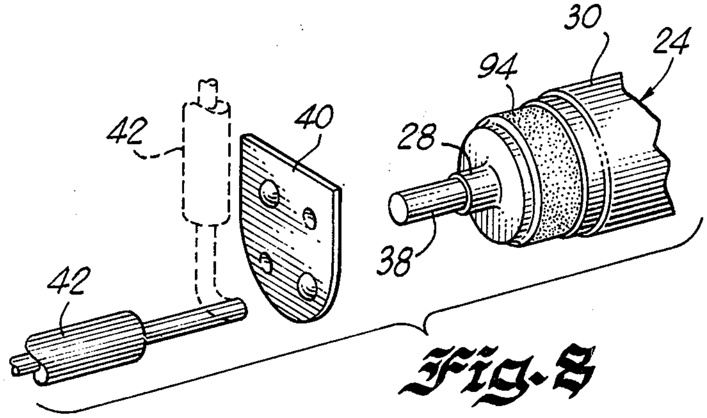
Fig. 8

GAS TUBE ARRESTER PROTECTOR AND METHOD OF ASSEMBLING THE PROTECTOR

The present application is a continuation-in-part of co-pending application Ser. No. 637,713, filed Dec. 4, 1975, now U.S. Pat. No. 4,051,546, and relates to a protector for protecting telephone lines from high voltages or surge currents, and more particularly, to a new and improved leaded protector having a gas tube arrester fusibly linked to the telephone lines and a method of making the protector.

Normally a pair of telephone lines are extended between a telephone central office and a remote location, such as a house or the like, to connect each telephone set, including all of the extensions for the same number, at a remote location to the telephone central office. For at least the purposes of the present application, the term "station" will be used to refer to not only the telephone equipment including the telephone set and the lines at a remote location, but also the environment such as the house or the like at which the equipment is located. Each such telephone line must be coupled to an overvoltage arrester so that the station including the telephone equipment on the property and/or the people using the equipment are protected from high voltages or surge currents occuring on the telephone lines due to lightning or the like.

There are various types of overvoltage arresters which can be coupled to the telephone lines to protect the telephone lines from such overvoltages or surge currents. Normally, the overvoltage arrester is either of the carbon type or the gas tube type. One such type of carbon overvoltage arrester which can be coupled to each telephone line is disclosed in U.S. Pat. No. 3,703,665, which patent is assigned to the assignee of record of the present application. As disclosed in U.S. Pat. No. 3,703,665, the overvoltage arrester has a spark gap which is sparked over due to a high voltage surge, thus permitting the surge current to flow from the protected line to ground potential instead of the telephone equipment at an individual station.

Many times, this type of carbon overvoltage arrester is mounted in a station protector, such as the ones disclosed in U.S. Pat. Nos. 3,310,712; 3,345,542; and 3,961,229, which patents also are assigned to the assignee of record of the present application. Such circuit protectors are capable of mounting the overvoltage carbon arresters so that the carbon arresters are coupled between the telephone line to be protected and ground potential. As a result, whenever a high voltage surge occurs on the protected line, the spark gap in the overvoltage arrester is sparked over and the telephone line is coupled to ground potential through the shorted spark gap.

In addition to the carbon type overvoltage arresters, gas tube type arresters can be used in protecting the telephone lines extending to a given station. The gas tube arresters are usually of the two or three electrode type. Certain of the two electrode gas tube arresters have a pair of opposed electrodes hermetically sealed in opposite ends of an insulating spacer tube. Each of the two electrodes has a portion extending into the spacer tube so that a spark gap is formed in the gas chamber formed within the spacer tube. In order to protect a telephone line, one of the electrodes is connected to the telephone line and the other electrode is connected to ground potential in much the same manner as the individual electrodes of the carbon type overvoltage arresters are connected to a telephone line and ground potential. As is the carbon type overvoltage arrester, whenever a high voltage of sufficient magnitude appears on the line connected to the one electrode, the spark gap within the insulating spacer tube breaks down such that the electrodes are electrically coupled together and the high voltage is diverted to ground potential.

In order to protect a pair of telephone lines at a given station, two separate two electrode gas tube arresters are required. In some instances, each of the two electrode gas tube arresters can be inserted in the same cavities of the station protectors disclosed in the aforementioned U.S. patents as the carbon type of arresters. On the other hand, a single three-electrode gas tube arrester can be used to protect a given pair of telephone lines extended to the station. Such a three-electrode gas tube arrester will normally have a pair of line electrodes that are connected by insulating spacer members at opposite ends of a central tubular ground electrode so that a spark gap is formed between each of the line electrodes and the central ground electrode. To protect a pair of telephone lines extended to the station, one of the lines is connected to one of the line electrodes; the other line is connected to the other line electrode; and a ground terminal is connected to the central ground electrode. When a high voltage occurs on either or both of the pair of telephone lines, the spark gap between the line electrode coupled to that line and the ground electrode sparks over such that the line is coupled to ground potential and is thereby protected. An example of a means by which the three-electrode gas tube arrester can be mounted in a station protector is disclosed in U.S. Pat. No. 4,009,421, which is assigned to the assignee of record of the present application.

In many instances, it is desirable to protect the lines not only by the carbon type of overvoltage arresters, but also by the gas tube type arresters operating in a parallel electrical configuration with a carbon arrester between each telephone line and ground. Station protectors equipped only with carbon arresters conventionally provide reliable protection to the telephone lines and station equipment by grounding the lines when exposed to sustained overvoltages caused by voltages being induced from or resulting from direct shorting with electric power lines. However, the carbon arresters are limited in the number of transient overvoltage surges caused by lightning or the like which can be momentarily grounded before the arrester permanently grounds the lines. On the other hand, gas tube arresters conventionally will withstand many more such overvoltage surges than carbon arresters but are less preferred for grounding the line and equipment under sustained overvoltage conditions.

An advantage is gained by paralleling gas tube and carbon arresters if the gas tube activates first under transient surges (rather than the carbon arrester), thus exploiting its longer life under such overvoltage transients until it fails either by grounding the telephone line and equipment, or by being a permanently open circuit. In the latter case, the carbon arrester then will respond to subsequent overvoltage transients until it fails by permanently grounding the line and equipment.

Sometimes a fusible element is included in the current path connecting the gas tube arrester to the telephone lines. Under sustained overvoltage conditions, the fusible element melts so as to open-circuit the current path between the gas tube arrester and the telephone line under such overvoltage conditions. By having such a fusible element only in the current path connecting the gas tube arrester to the telephone lines, the preferred performance of the carbon arrester under such sustained overvoltages will then take over to protect the lines and equipment.

Often the gas tube arrester is mounted in the same station protector, such as one of the ones heretofore discussed, as the carbon type of overvoltage arrester. However, at times when there is a sustained overvoltage condition with relatively low levels of available current, such as when there is one ampere due to a power line cross or induced voltage, the spark gap between the line electrode and the common or ground electrode in the gas tube type of arrester will breakdown, but in a high impedance state. As a result, the gas tube arrester is maintained in a glow discharge region of operation or in a glow mode condition. In the glow mode condition, the gas tube arrester is heated due to the passage of current through the relatively high impedance of the spark gap. If the gas tube arrester remains in this glow mode condition for a sufficient amount of time, the arrester would continue to heat until serious physical degradation of the gas tube arrester, and possibly the station protector in which it is located, would occur. The resulting damage to the station protector would leave the lines at the given station unprotected.

Accordingly, objects of the present invention are to provide a new and improved gas tube overvoltage arrester protector utilized to protect telephone lines from high voltages or surge currents; to provide a new and improved overvoltage arrester protector that can be readily coupled in parallel with carbon type arresters to telephone lines; to provide a new and improved overvoltage arrester protector that is readily mounted in available station protectors containing carbon type arresters; to provide a new and improved overvoltage arrester protector that contains a fail open mechanism such that the arrester is disconnected from the telephone lines before the protector is damaged due to heating or the like; to provide a new and improved overvoltage arrester protector that has a fusible lead connecting the line electrodes of the arrester to the lines to be protected; to provide a new and improved overvoltage arrester protector that minimizes the thermal heat transfer from the gas tube arrester during extended conduction of the gas tube arrester; to provide a new and improved overvoltage arrester protector that is designed to protect the station protector from damage when a coordinating or bridle wire connecting the telephone lines to a station protector will not fuse open; to provide a new and improved overvoltage arrester protector in which a gas tube arrester can easily be mounted within an insulating housing by means of line contacts and spacers fitted about leads connected to the electrodes of the arrester; to provide a new and improved overvoltage arrester protector that permits the gas tube arrester to be mounted through an open end of an insulating housing prior to sealing that open end of the housing; to provide a new and improved overvoltage arrester protector that permits utilization of percussive welding techniques to attach fusible leads to the line electrodes of the arrester used therein; and to provide a new and improved method of assembly of an overvoltage arrester protector.

In accordance with these and many other objects of the present invention, an embodiment of the present invention comprises an overvoltage arrester protector used in protecting pairs of telephone lines at a given station or the like from high voltages or surge currents occurring on the telephone lines. The overvoltage arrester protector includes a three electrode gas tube arrester with a pair of line electrodes at either end of a central ground electrode. Each of the line electrodes is coupled to one of the pair of telephone lines by a fusible link welded to the line electrode and soldered to a line contact or plate, which contact is coupled to the telephone line by a terminal line. The ground electrode is coupled to a ground potential by a ground lead attached to the central ground electrode. The gas tube arrester is positioned in an elongated shell or housing which has one elongated side substantially open, slots formed on opposed side walls by ribs located thereon, and a groove located peripherally about the open side of the housing, by fitting the line contacts into the slots and by positioning overlapping spacers or covers having slots through which the terminal lines extend in the grooves located about the open side of the housing. Once the gas tube arrester is mounted in the housing, an epoxy resin may be utilized to close the remaining portion of the open side of the housing. The utilization of the line contacts and the spacers to position the gas tube arrester in the housing enables the overvoltage arrester protector to be readily assembled.

Many other objects of the present invention will become apparent from considering the following detailed description in conjunction with the drawings in which:

FIG. 7 is a partially cut away exploded view of the various components of the overvoltage arrester protector of FIG. 1;

FIG. 8 is a partially cut away perspective view of certain components of the overvoltage arrester protector of FIG. 1 prior to the assembly of those components to each other; and FIG. 9 is a partial cross-sectional view of the overvoltage arrester of FIG. 1 shown with the spacers being inserted into the housing during assembly.

Figure 1:
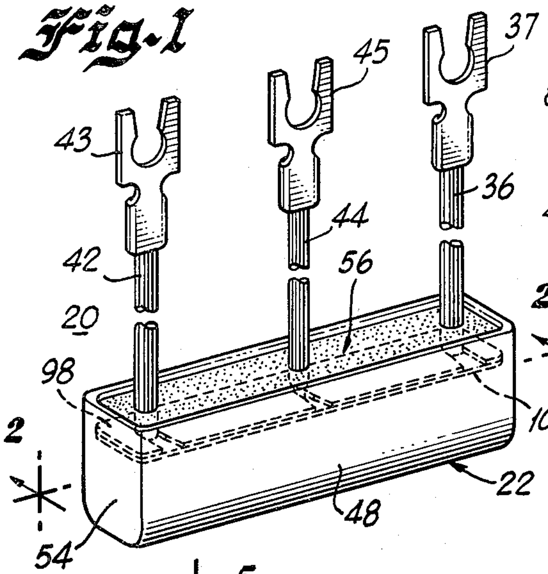
FIG. 1 is a perspective view of the overvoltage arrester protector embodying the present invention.
Figure 2:
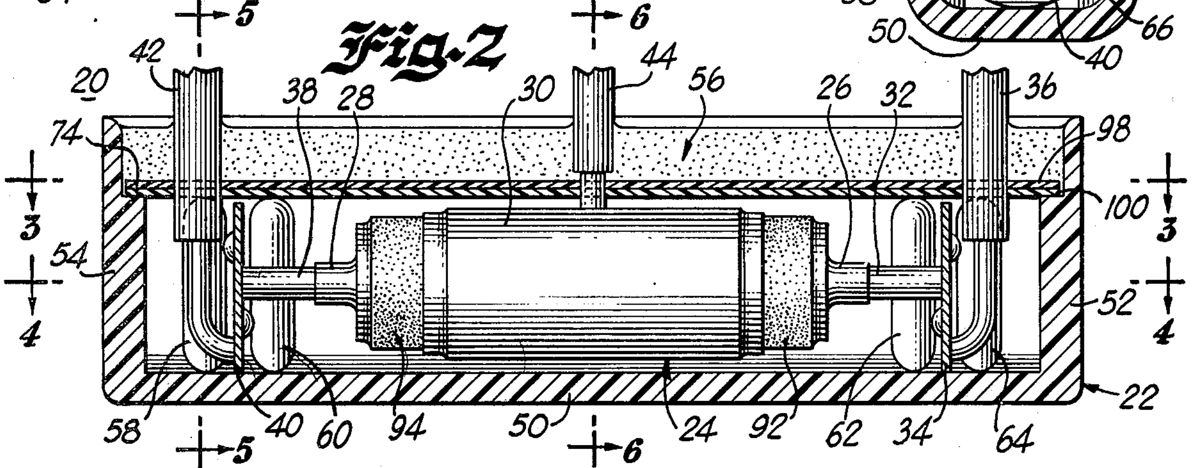
FIG. 2 is a cross-sectional view of the overvoltage arrester protector of FIG. 1 taken along line 2—2 of FIG. 1.
Figure 3:
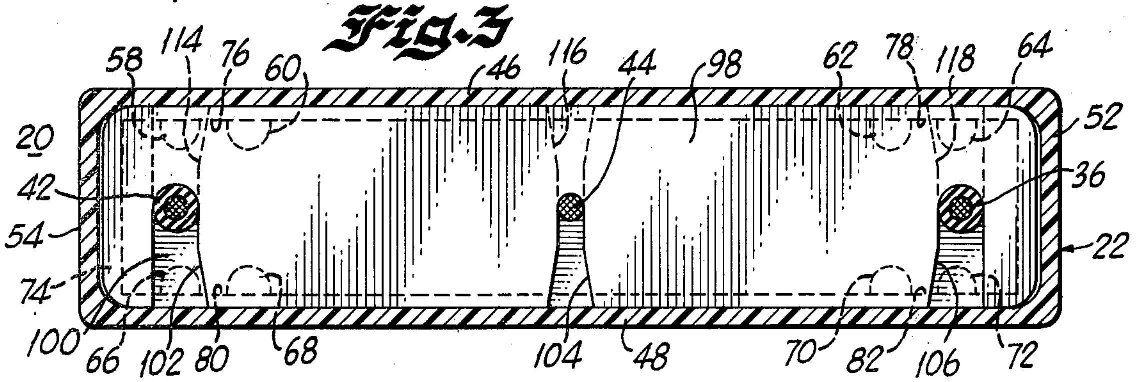
FIG. 3 is a cross-sectional view of the overvoltage protector of FIG. 2 taken along line 3—3 of FIG. 2.
Figure 4:
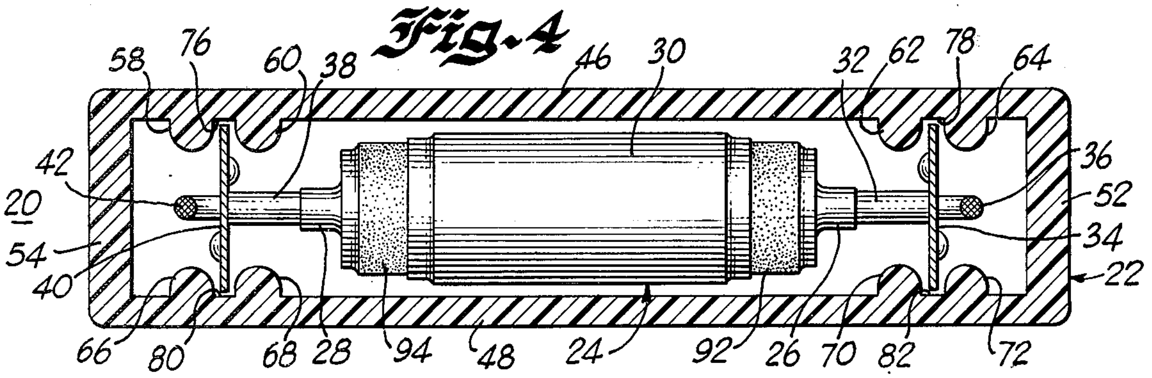
FIG. 4 is a cross-sectional view of the overvoltage protector of FIG. 2 taken along line 4—4 of FIG. 2.

Referring now more specifically to FIGS. 1 and 2 of the drawings, there is disclosed a gas tube arrester protector which is generally designated by the number 20, and which embodies the present invention. The gas tube protector 20 includes an outer insulating shell or housing 22 in which is housed a gas tube overvoltage arrester 24. The gas tube arrester 24 is a three electrode type of gas tube arrester having a pair of line electrodes 26 and 28 at opposite ends of a common or ground electrode 30. The line electrode 26 is coupled to a telephone line to be protected through a fusible link 32, a generally U-shaped, flat line contact 34, a terminal line or lead 36 and a spade lug or terminal 37. The other line electrode 28 is similarly coupled to another telephone line to be protected through a fusible link 38, a generally U-shaped, flat line contact 40, a terminal line or lead 42 and a spade lug or terminal 43. The common or ground electrode 30 is coupled to ground potential through a ground lead 44 and a spade lug or terminal 45.

Whenever an overvoltage surge condition occurs on either of the telephone lines connected to the terminal leads 36 and 42, a spark gap formed between the line electrode 26 and the common ground electrode 30 and/or a spark gap formed between the line electrode 28 and the common ground electrode 30 is sparked over or shorted such that the line coupled to the terminal lead 36 and/or the terminal lead 42 are coupled to ground potential through the gas tube arrester 24 and the ground lead 44. In such a condition, the spark gap arcs over so that there is a relatively small impedance between the line electrodes 26 and 28 and the ground electrode 30.

However, in certain instances when available currents are relatively low (such as below 1 ampere) due to a power line cross or the like, the spark gaps in the gas tube arrester 24 break down, but remain in a high impedance state such that the gas tube arrester 24 is placed in a condition which is sometimes referred to as a glow mode of operation. If the overvoltage condition remains for an extended period of time, the heat generated by the flow of current through the gas tube arrester 24 can cause damage to occur to the protector 20 and any other objects or devices in close proximity to the protector 20. Consequently, the fusible links 32 and 38 are coupled to the line electrodes 26 and 28, respectively, in such a manner that the fusible links 26 and 28 will melt in such instances so that the circuits between the terminal lead 36 and the line electrode 26 and between the terminal lead 42 and the line electrode 28 are open before any damage is done to the protector 20 and the areas adjacent to it. As a result, the protector 20 is protected from damages caused due to the heat generated in the instances where the over-voltage condition remains for an extended period of time.

More specifically, the housing 22 is made of an appropriate dielectric material and is of an elongated, generally U-shaped configuration with opposed side walls 46 and 48 interconnected by an elongated connecting or bight wall 50. The ends of the housing 22 are closed by opposed end walls 52 and 54 and the side opposite to the wall 50 is substantially open to form an opening 56 for easy access to the inside of the housing 22. A number of ribs 58, 60, 62 and 64 are located on the side 46 adjacent the end walls 52 and 54. Likewise, a set of ribs 66, 68, 70 and 72 is located on the wall 48 adjacent the end walls 52 and 54. Each of the ribs 58, 60, 62, 64, 68, 70 and 72 extends from the wall 50 to a ledge 74 that is located near the opening 56 and that extends circumferentially around the inner surfaces of the walls 46, 52, 48 and 54 of the housing 22. The ribs 58 and 60 are disposed adjacent each other such that a slot 76 is formed therebetween. Similarly, the ribs 62 and 64 are disposed adjacent each other to form a slot 78 therebetween; the ribs 66 and 68 are disposed adjacent each other to form a slot 80 therebetween; and the ribs 70 and 72 are disposed adjacent each other to form a slot 82 therebetween. In addition, ribs 84 and 85 extend along the inner surface of the wall 46 and ribs 86 and 87 extend along the inner surface of the wall 48. The ribs 84-87 are located between the ledge 74 and the opening 56 such that a groove 88 is formed between the ribs 84 and 85, a groove 89 is formed between the ribs 86 and 87, a groove 90 is formed between the rib 85 and the ledge 74, and a groove 91 is formed between the rib 87 and the ledge 74.

As indicated above, the arrester 24, which is located in the housing 22, is a gas tube arrester of a standard configuration and design having its line electrodes 26 and 28 hermetically sealed at the ends of the tubular central ground electrode 30. This is accomplished by ceramic spacers 92 and 94, respectively. A portion of the electrode 26 projects past the spacer 92 into the chamber formed by the central ground electrode 30 so as to form a spark gap between the line electrode 26 and the ground electrode 30. Similarly, the line electrode 28 projects past the insulating spacer member 94 into the tubular ground electrode 30 so that a spark gap is also formed between the line electrode 28 and the ground electrode 30. Whenever a voltage of sufficient magnitude is impressed on either of the line electrodes 26 or 28, the spark gap between that electrode and the ground electrode 30 breaks down such that the electrode is coupled to the ground electrode 30.

If the overvoltage surge causes a sufficient current, such as when a voltage spike occurs due to lightning or the like, the spark gap will completely arc over and the impedance between the line electrodes 26 and 28 and the ground electrode 30 will be relatively small. On the other hand, if the sustained overvoltage condition is caused by a power cross or the like, the available current in some instances will be relatively low and the gas tube arrester 24 is placed in a glow mode of operation. In this glow mode of operation the spark gaps break down, but a relatively high impedance is maintained across the spark gaps between the line electrodes 26 and 28 and the ground electrode 30. Consequently, the protector 20 can be seriously damaged if this condition continues for a sufficient period of time.

As indicated heretofore and as can best be seen in FIGS. 2, 4, 7 and 8, the line electrodes 26 and 28 are not directly connected to their respective terminal lines 36 and 42. Instead, the line electrode 26 is coupled to the terminal line 36 through the fusible link 32 and the line contact 34, and the line electrode 28 is coupled to the terminal line 42 through the fusible link 38 and the line contact 40. The fusible link 32 is attached to the line electrode 26 by appropriate means such as percussive welding and the fusible link 38 is similarly coupled to the line electrode 28 by percussive welding. The other end of the fusible link 32 is attached to the line contact 34 by hand soldering or the like, and the other end of the fusible link 38 is attached to the line contact 40 by hand soldering or the like. Likewise, the ground lead 44 is coupled to the ground electrode 30 by percussive welding. Advantageously, the connection of the fusible links 32 and 38 to the line electrodes 26 and 28, respectively, and the ground lead 44 to the ground electrode 30 by percussive welding enables that operation to be done completely by automation without the need of preparation of the parts, such as cleaning and the like, and without the need of operator's skill normally associated with soldering. However, it has been found that it is better to solder the fusible links 32 and 38 to the line contacts 34 and 40, respectively.

The other side of the line contact 34 has the terminal lead 36 attached thereto by percussive welding or the like. Likewise, the terminal lead 42 is coupled to the line contact 40 by percussive welding. As a result, any voltages that are present on the line connected to the terminal 37 are coupled to the line electrode 26 through the terminal line 36, the line contact 34 and the fusible link 32, and any voltages impressed on the telephone line coupled to the terminal 43 are coupled to the line electrode 28 through the terminal line 42, the line contact 40 and the fusible link 38.

If an overvoltage surge occurs on the telephone line coupled to the terminal 37 and is of high enough magnitude, the spark gap between the line electrode 26 and the ground electrode 30 is sparked over such that the current flows to ground potential through the ground line 44 and the ground terminal 45. In this manner, the telephone line coupled to the terminal 37 is protected from such overvoltage surges. Similarly, the line coupled to the terminal 43 is protected. As long as the overvoltage surge is of a minimum time duration, the gas tube arrester 24 will be heated a minimum amount and reverted to its normal state, wherein the spark gap is open between the line electrode 26 and the ground electrode 30 after the overvoltage condition terminates.

In certain situations, an overvoltage condition occurring on the telephone line coupled to either the terminal 37 or the terminal 43 can cause damage to the gas tube arrester 24 as well as the entire protector 20. This is due to the amount of heat that is generated as a result of the current flowing through the shorted spark gap between the line electrodes 26 and 28 and the ground electrode 30 for an extended period of time. If the current through the gas tube arrester 24 caused by such an extended overvoltage conditon is in excess of a certain current level, the coordinating wire or bridle wire, which normally connects the telephone line to be connected to the terminal 37 of the terminal 43, would fuse open prior to any damage being done to the gas tube arrester 24. However, if the current is below the fuse open characteristics of such coordinating or bridle wires, such as when the available current is below one ampere and the gas tube arrester is placed in a glow mode of operation, the continuous conduction of the current through the gas tube arrester 24 could damage it as well as the protector 20. Subsequently, the station protector or the like in which the protector 20 is mounted also can be damaged. Consequently, the lines coupled to the terminals 37 and 43 at the given station would no longer be protected.

Accordingly, it is important to have the fusible links 32 and 38 fuse in an open condition when such continuous or extended conduction of the gas tube arrester 24 occurs and before damage to the gas tube arrester 24 or the housing 22 occurs. This type of extended conduction of the gas tube arrester 24 can particularly cause damage when the gas tube arrester 24 is placed in the aforementioned glow mode condition as a result of a power line cross or induced voltage or the like because the spark gaps between the line electrodes 26 and 28 and the ground electrode 30 are not placed in a low impedance state, but rather the spark gaps between the line electrodes 26 and 28 and the ground electrode 30 are maintained in a breakdown state with a relatively high impedance. In this type of situation, the gas tube arrester 24 is heated to a great extend so that the housing 22 of the protector 20 can be readily damaged.

However, with the fusible link 32 coupled between the line contact 34 and the line electrode 26 and the fusible link 38 coupled between the line contact 40 and the line electrode 28, the gas tube arrester 24 is protected from being so overheated. The fusible links 32 and 38 are preferably made of a common lead tin alloy which will melt and open the circuits between the line contact 34 and 40 and the line electrodes 26 and 28, respectively, when low current surges occur and before extensive heat damage can occur to the housing 22.

More specifically, the fusible links 32 and 38 will be heated due to the thermal heat generated in the gas tube arrester 24. As they are heated, the fusible links 32 and 38 will begin to neck down and become molten. Finally, the fusible links 32 and 38 break apart partially due to the surface tension on the molten fusible links 32 and 38, resulting in the circuits between the line electrodes 26 and 28 and their respective terminal lines 36 and 42 to be open. With the line electrode 26 being disconnected from the telephone line coupled to the terminal 37 and the line electrode 28 being disconnected from the telephone line coupled to the terminal 43, no current flows through the gas tube arrester 24 and no further heat is generated therein.

As previously indicated, the fusible links or leads 32 and 38 can be made of a common lead tin alloy. The selection of such an alloy for the fusible links 32 and 38, and the physical shape and size of the fusible links 32 and 38 are determined by the fact that the fusible links 32 and 38 must have a greater current carrying capacity than the coordinating or bridle wires which interconnect the telephone lines to the protector 20. However, the fusible links 32 and 38 must still be capable of fusing open when extended low current surges occur and before extensive heat damage to the shell 22 occurs. In addition, the fusible links 32 and 38 must be readily coupled both electrically and thermally to the line electrodes 26 and 28, respectively, and must take a minimal volume of space so that the contact between the gas tube arrester line electrodes 26 and 28 and the line contacts 34 and 40, respectively, are not reestablished once the links 32 and 38 have melted.

Advantageously, the protector 20 and particularly the housing 22 enables the gas tube arrester 24 to be readily and easily disposed within the housing 22 during the assembling of the protector 20. More specifically, prior to the insertion of the gas tube arrester 24 into the housing 22, what might be termed a gas tube arrester sub-assembly 96, which can be best seen in FIG. 7 and includes the leads 36, 42 and 44 with their respective terminals 37, 43 and 45; the line contacts 34 and 40; the fusible links 32 and 38; and the gas tube arrester 24, is assembled. Thereafter, the line contact 34 can be disposed in the slots 78 and 82 and the line contact 40 can be disposed in the slots 76 and 80 such that the gas tube arrester sub-assembly 96 is positioned within the housing 22 as can be seen for instance in FIG. 2. The positioning is accomplished because the bottom U-shaped portions of the line contacts 34 and 40 lodge against the wall 50 of the housing 22 and are retained from movement in a direction along the axis extending between the end walls 52 and 54 by the ribs 58, 60, 62, 64, 66, 68, 70 and 72, which form the slots 76, 78, 80 and 82 into which the line contacts 34 and 40 are disposed. Once the gas tube arrester sub-assembly 96 is so positioned within the housing 22, spacers or covers 98 and and 100 can be positioned about the leads 36, 42 and 44 and into the grooves 90 and 91 in the housing 22.

More specifically, the spacers 98 and 100 are made of an appropriate insulating material that is somewhat stiff, but yet flexible enough so that the spacers 98 and 100 can be positioned within the housing 22. The spacer 98 has slots 102, 104 and 106 which terminate in rounded portions 108, 110 and 112, respectively. Similarly, the spacer 100 has slots 114, 116 and 118 which extend into the spacer 100 and terminate in rounded portions 120, 122 and 124, respectively. Once the gas tube arrester sub-assembly 96 is positioned in the housing 22 as heretofore described, the spacer 100 is fitted about the leads 42, 44 and 36 by moving the spacer 100 such that the leads 42, 44 and 36 are inserted though the slots 114, 116 and 118, respectively, into the rounded portions 120, 122 and 124 of those slots 114, 116 and 118. Thereafter, the spacer 100 is inserted through the opening 56 in the housing 22 so as to lodge in the grooves 90 and 91. This is done as indicated in FIG. 9 by having the side of the spacer 100 from which the slots 114, 116 and 118 extend inserted into the groove 90 formed between the rib 85 and the ledge 74. Since the spacers 100 is somewhat flexible, it therefore can be pushed past the rib 87 on the wall 48 of the housing 22 so as to lodge in the groove 91 formed by the rib 87 and the ledge 74.

Figure 6:
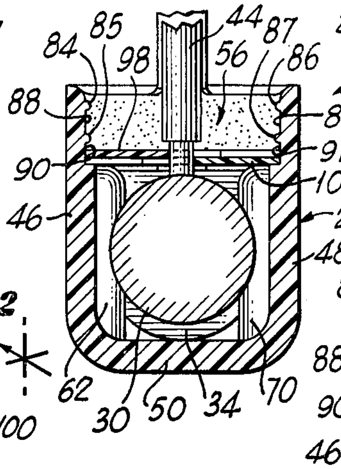
FIG. 6 is a cross-sectional view of the overvoltage protector of FIG. 2 taken along line 6—6 of FIG. 2.
Figure 5:
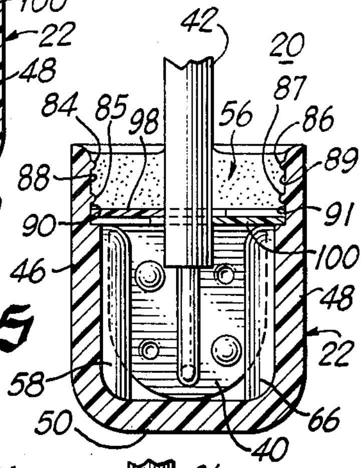
FIG. 5 is a cross-sectional view of the overvoltage protector of FIG. 2 taken along line 5—5 of FIG. 2.

Similarly, the spacer 98 is fitted about the leads 42, 44 and 36 by positioning the spacer 98 such that the leads 42, 44 and 36 are inserted through the slots 102, 104 and 106, respectively, into the rounded portions 108, 110 and 112. Once so positioned, the spacer 98 is inserted into the housing 22 and lodged in the grooves 90 and 91 with the spacer 100 in much the same manner as was the spacer 100 positioned into the grooves 90 and 91. In other words, one side of the spacer 98, the side from which the slots 102, 104 and 106 extend, is inserted into the groove 91 and then is allowed to pass by the rib 85 so that the other side fits into the groove 90. Once the spacers 98 and 100 have been so inserted into the housing 22, they are positioned as shown in, for instance, FIGS. 2, 5 and 6 of the drawings, on the ledge 74.

The spacers 98 and 100, once so positioned in the housing 22, not only substantially close the open end 56 of the housing 22 but also assist in positioning the gas tube arrester sub-assembly 96 in the housing 22 because the spacers 98 and 100 grasp the leads 42, 44 and 36 when positioned as heretofore described. Consequently, the gas tube arrester sub-assembly 96 cannot rotate about the elongated axis of the housing 22 extending between the end walls 52 and 54. It might be noted that the slots 104 and 116 are narrower than the slots 102, 106, 114 and 118 and the rounded portions 110 and 122 are similarly smaller than the rounded portions 108, 112, 120 and 124. This is because the slots 104 and 116 are fitted about the conductor in the ground lead 44 whereas the slots 102, 106, 114 and 118 are fitted about the insulation on the terminals leads 42 and 36 as is seen in FIGS. 2, 3, 6 and 9 of the drawings.

Once the spacers 98 and 100 are positioned in the housing 22, the assembly of the gas tube arrester protector 20 is essentially accomplished. However, if it is desired to completely seal the opening 56, an appropriate epoxy can be inserted to fill the portion of the housing 22 extending from the spacers 98 and 100 to the top of the opening 56. The spacers 98 and 100 aid in this sealing or epoxy top-off of the opening 56 because they do not allow the ingress of the epoxy into the portion of the housing 22 whereat the gas tube arrester 24 is disposed so that none of the epoxy will interfer with the performance of the fusible links 32 and 38.

As readily can be appreciated, the protector 20 is quite suitable for efficient assembling. In order to so assembly the protector 20, the gas tube arrester sub-assembly 96 is first prepared by percussive welding the fusible link 32 to the line electrode 26 and percussive welding the fusible link 38 to the line electrode 28. The terminals 37, 43 and 45 are attached to the respective leads 36, 42 and 44 by crimping or the like and then the line terminal leads 36 and 42 are percussive welded to the line contacts 34 and 40, respectively. The fusible link 32 then is soldered to the line contact 34 and the fusible link 38 is soldered to the line contact 40. In FIG. 8 of the drawings, the general assembly of the fusible link 38 to the line contact 40 and the terminal lead 42 to the line contact 40 is illustrated. Once this has been accomplished, the ground lead 44 is percussive welded to the ground electrode 30 of the gas tube arrester 24.

The gas tube arrester sub-assembly 96 can then be inserted to the housing 22 as heretofore described. Once so inserted, the spacers or covers 98 and 100 can be interweaved about the terminal lines 36, 42 and 44 and snapped into the grooves 90 and 91 in the housing 22. In this manner, the gas tube arrester sub-assembly 96 is completely positioned properly within the housing 22 and the opening 56 can be sealed by an appropriate epoxy, if desired.

Advantageously, the positioning of the gas tube arrester 24 in the housing 22 by the line contacts 34 and 40 and the spacers 98 and 100 enable the gas tube arrester 24 to be positioned in the housing 22 spaced apart from the walls 46, 48, 50, 52 and 54 of the housing 22. The positioning of the gas tube arrester 24 in this manner tends to minimize the thermal heat transfer from the gas tube arrester 24 to the housing 22 during extended conduction conditions of the gas tube arrester 24. This delaying of the heat loss from the gas tube arrester 24 tends to raise the temperature of the electrodes 26 and 28 during such extended conduction periods so that a more effective and efficient operation of the melting of the fusible links 32 and 38 results such that there will be less degradation of the gas tube arrester 24 or the housing 22 during such extended conduction periods. This positioning of the gas tube arrester 24 in the manner heretofore described also eliminates the need for any type of mineral fill or the like encompassing the gas tube arrester 24 and separating the gas tube arrester 24 from the housing 22.

Although the present invention is described with reference to one illustrative embodiment thereof it should be understood that numerous other modifications and embodiments of the invention can be devised by those skilled in the art that will fall within the spirit and scope of the principles of this invention.

What is claimed as new and desired to be secured by U.S. Letters Patent of the United States is:

1. An overvoltage arrester protector for protecting telephone lines from high voltage and surge currents comprising:

a generally hollow elongated housing having one side substantially open for access into said housing and having retaining means on the inside walls of said housing;

a gas tube overvoltage arrester having at least first and second electrodes;

lead means to be coupled to said telephone lines;

fusible means coupled to each of said first and second electrodes;

contact means attached to said fusible means and said lead means and disposed in said retaining means such that said gas tube overvoltage arrester is positioned within said housing; and spacer means having slots therein to receive said lead means, said spacer means being positioned through the open side of said housing to further retain said gas tube overvoltage arrester in said housing and to substantially close said open side of said housing.

2. The overvoltage arrester protector as set forth in claim 1 wherein said retaining means includes ribs projecting from the walls of said housing so as to form slots into which said contact means are inserted, said ribs being located on opposite walls of said housing such that said slots are aligned to receive said contact means.

3. The overvoltage arrester protector as set forth in claim 1 wherein said spacer means are somewhat flexible insulating material with slots formed through a portion of said spacer means and terminating in rounded portions so as to receive said lead means.

4. The overvoltage arrester protector as set forth in claim 1 wherein said fusible means is percussive welded to said first and second electrodes.

5. The overvoltage arrester protector as set forth in claim 1 wherein said lead means are percussive welded to said contact means.

6. The overvoltage arrester protector as set forth in claim 1 wherein said fusible means is soldered to said contact means.

7. An overvoltage arrester protector for protecting telephone lines from high voltages and surge currents comprising:

- an elongated housing having one side substantially open for access into said housing and having opposed end walls and opposed side walls extending between said end walls, said housing having first retaining means formed in the inside of said housing on said side walls adjacent one of said end walls and second retaining means formed in the inside of said housing on said side walls adjacent the other of said end walls;
- a gas tube arrester having first and second line electrodes and a ground electrode coupled to reference potential;
- first contact means disposed in said first retaining means and spaced apart from said first electrode;
- second contact means disposed in said second retaining means and spaced apart from said second electrode;
- a first fusible means extending between said first electrode and said first contact means, said first fusible means coupling said first contact means to said first electrode and maintaining said first contact means spaced apart from said first electrode; and
- a second fusible means extending between said second electrode and said second contact means, said second fusible means coupling said second contact means to said second electrode and maintaining said second contact means spaced apart from said second electrode such that said gas tube arrester is positioned within said housing by said first and second contact means so as to be spaced from each of the walls of said housing.

8. The overvoltage arrester protector as set forth in claim 7 wherein said first and second fusible means are made of a fusible material designed to melt when the gas tube arrester becomes sufficiently heated and are designed to have a current carrying capacity at least as great as connecting wires connecting said gas tube arrester protector to said telephone lines.

9. The overvoltage arrester protector as set forth in claim 7 wherein said first fusible means is percussive welded to said first line electrode and said second fusible means is percussive welded to said second line electrode.

10. The overvoltage arrester protector as set forth in claim 7, including a first terminal lead coupled to said first contact means and a second terminal lead coupled to said contact means, said first terminal lead being coupled to one of said telephone lines and said second terminal lead being coupled to another of said telephone lines, and including a ground lead coupled to said ground electrode of said gas tube arrester.

11. The overvoltage arrester protector as set forth in claim 10, including spacer means having slots therein to receive said first and second terminal leads and said ground lead, said spacer means being positioned through the open side of said housing to further retain said gas tube arrester in said housing and to substantially close said open side of said housing.

12. The overvoltage arrester protector as set forth in claim 11, including sealing means to seal the open end of said housing outwardly from said spacer means.

13. The overvoltage arrester protector as set forth in claim 11, including groove means formed in said side walls of said housing into which said spacer means are insertable.

14. The overvoltage arrester protector as set forth in claim 11 wherein said spacer means includes first and second spacers, said first spacer having first slot means engaging said first and second terminal leads and said ground lead from one side thereof, and said second spacer having second slot means engaging said first and second terminal leads and said ground lead from the other opposite side thereof such that said first and second spacers engage said first and second terminal leads and said ground lead to further assist in positioning said gas tube arrester in said housing.

15. An overvoltage arrester protector for protecting telephone lines from high voltage and surge currents comprising:

- a housing means having opposed side walls and one side substantially open for access into said housing, said housing having slot means on the inside of said side walls of said housing;
- a gas tube arrester having at least first and second electrodes;
- first elongated fusible means being coupled at a first end of said first fusible means to said first electrode and second elongated fusible means being coupled at a first end of said second fusible means to said second electrode;
- first contact means attached to a second end of said first fusible means and disposed in said slot means; and
- second contact means attached to a second end of said second fusible means and disposed in said slot means such that said gas tube arrester is properly positioned within said housing.

16. The overvoltage arrester as set forth in claim 15, including a first terminal lead coupled to said first contact means and extending out from said housing means and a second terminal lead coupled to said second contact means and extending out from said housing means.

17. The overvoltage arrester protector as set forth in claim 16, including spacer means having slots therein through which said first and second terminal leads extend and by which said first and second terminal leads are engaged, said spacer means being lodged in said open side of said housing means so as to substantially close said open side.

18. The overvoltage arrester protector as set forth in claim 17 wherein said spacer means includes first and second spacers, said first spacer having first slots therein through which said first and second terminal leads extend, and a second spacer having second slots therein through which said first and second terminal leads extend, said first and second spacers being positioned in said housing so as to substantially close the open end of said housing.

19. The overvoltage arrester protector as set forth in claim 17, including sealing means to further seal the open side of said housing.

* * * * *